J. J. K. KOUGHAN.
CLAMP FOR HOISTING ROPES.
APPLICATION FILED MAY 20, 1914.

1,148,387.

Patented July 27, 1915.

WITNESSES
Paul Bartelt
Walton Harrison

INVENTOR
John J. K. Koughan
BY Munn & Co
ATTORNEYS

UNITED STATES PATENT OFFICE.

JOHN J. K. KOUGHAN, OF SOUTH BERKELEY, CALIFORNIA.

CLAMP FOR HOISTING-ROPES.

1,148,387.   Specification of Letters Patent.   Patented July 27, 1915.

Application filed May 20, 1914. Serial No. 839,753.

*To all whom it may concern:*

Be it known that I, JOHN J. K. KOUGHAN, a citizen of the United States, residing at South Berkeley, in the county of Alameda and State of California, have invented certain new and useful Improvements in Clamps for Hoisting-Ropes, of which the following is a specification.

The invention relates to an improved hook for clamping hoisting ropes used for handling freight; the device being particularly serviceable on ship board and in warehouses.

The device comprises a slotted link and a hook pivoted therein, both the link and hook being provided with extensions adapted to clamp the rope when properly adjusted therewith.

Reference is made to the accompanying drawings forming a part of this specification, and in which like letters indicate like parts.

Figure 1:
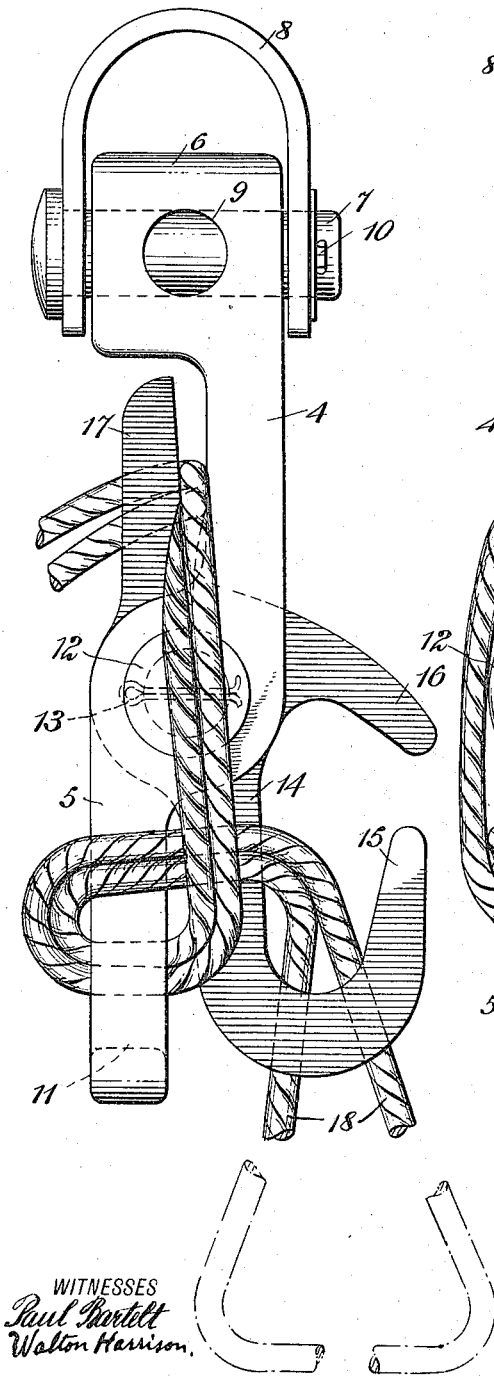
Figure 2:
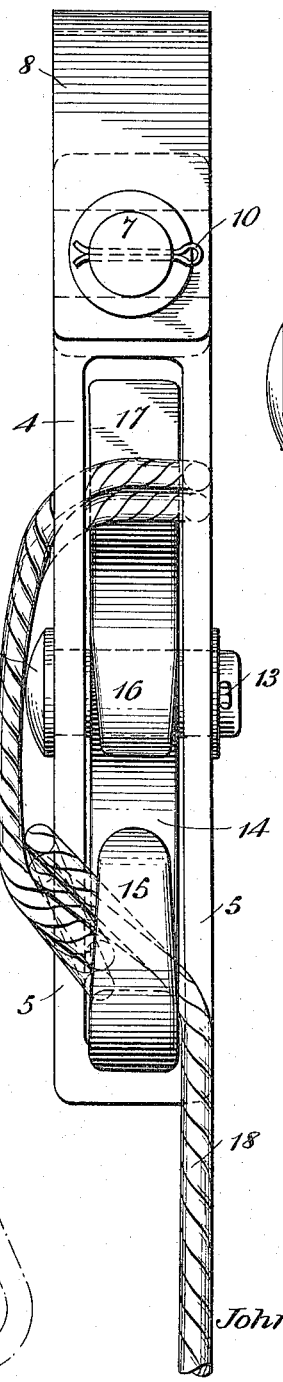
Figure 3:
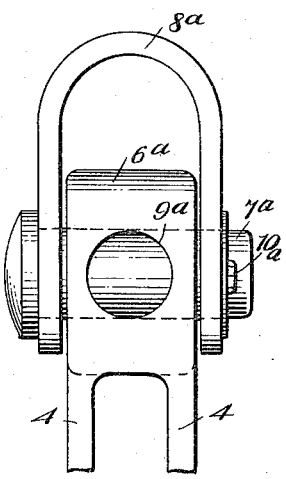

Figure 1 is a side elevation of my rope clamp complete and in use. Fig. 2 is a front elevation of the same. Fig. 3 shows a slightly different form for the upper portion of the link, forming a part of the device.

A link 4 is provided with a downwardly extending arm 5 and with an eye 6. A bolt 7 extends through the eye 6 and carries a clevis 8. The eye 6 is provided with an extra hole 9 for enabling the hook to be used as indicated in Fig. 3, as hereinafter explained. A cotter pin 10 extends through the bolt 7 for holding the same in position. The portion 5 of the link 4 is provided with a horizontally extending portion 11, for preventing the hook from closing too tightly, when operated under certain working conditions, and to prevent the portion 5 of the link 4 from being unduly flattened when a load is on. A pivot pin 12 extends through the link 4, and carries a cotter pin 13 for holding this pivot pin in position.

A rocking member 14 is supported by the pivot pin 12 and is bent outwardly and upwardly so as to form a bill 15. A nose or horn like projection 16, extends obliquely toward the bill 15, the bill 15 and portion 16 thus as a whole having approximately the form of a C. The member 14 is further provided with a straight extending portion 17, constituting practically a jaw.

Two hoisting ropes or cords are shown at 18. These may be bent over the bill 15 and around the pendent arm 5 of the link 4, then upward and partially around the jaw 17. Then when a pull is made upon the lower portions of the cords 18, so as to swing the rocking member 14, the jaw 17 presses the adjacent portions of the cords tightly against the upper part of the link 4, as indicated in Fig. 1.

In some instances, a pin 7$^a$ (see Fig. 3) is extended through the hole 9, and connected with a clevis 8$^a$, which is a little smaller than the clevis 8. A cotter pin 10$^a$ prevents the withdrawal of the pin 7$^a$.

Having thus described my invention, what I claim as new and desire to secure by Letters Patent is as follows:

1. A rope clamp, comprising a link having an eye at its lower end, and a member pivoted in the link intermediate of the ends thereof, said member having a downwardly extending curved bill at one side of the lower portion of the link and an upwardly extending straight portion at the side of the upper portion of the link opposite that of the bill.

2. A rope clamp, comprising a link having a downwardly extending offset arm, said arm being provided with an eye at its end, and a member pivoted to the link at the junction of the arm with the link and having a bill and an upwardly extending portion forming a jaw for clamping a rope against the link after it has been passed over the bill and through the eye.

3. A rope clamp comprising a link provided with an eye disposed adjacently to one end of said link, a rocking member located within said link and having portions collectively formed into an approximately C-shape, said rocking member being further provided with an extending portion constituting a jaw, and a pivot pin extending through said link and through said rocking member, and movable toward and from a portion of said link.

In testimony whereof, I have signed my name to this specification in the presence of two subscribing witnesses.

JOHN J. K. KOUGHAN.

Witnesses:
 C. S. PRAY,
 H. C. HONDLETTE, Jr.

Copies of this trade-mark may be obtained for five cents each, by addressing the "Commissioner of Patents, Washington, D. C."